(12) United States Patent
Collier, Jr.

(10) Patent No.: US 6,405,720 B1
(45) Date of Patent: Jun. 18, 2002

(54) NATURAL GAS POWERED ENGINE

(76) Inventor: R. Kirk Collier, Jr., NRG Technologies, Inc. 681 Edison Way, Reno, NV (US) 89502

( * ) Notice: Subject to any disclaimer, the term of this patent is extended or adjusted under 35 U.S.C. 154(b) by 0 days.

(21) Appl. No.: 09/541,542

(22) Filed: Apr. 3, 2000

(51) Int. Cl.$^7$ .............................................. F02M 25/07
(52) U.S. Cl. ..................................... 123/568.12; 123/3
(58) Field of Search ............................. 123/3, 568.11, 123/568.12, 568.21, 679, 680, 698, DIG. 12

(56) References Cited

U.S. PATENT DOCUMENTS

| | | | |
|---|---|---|---|
| 1,628,066 A | 5/1927 | Rose | 48/199 FM |
| 1,936,155 A | 11/1933 | Florez | 48/199 FM |
| 3,759,678 A | 9/1973 | Chamberland et al. | 48/214 A |
| 3,825,487 A | 7/1974 | Wilhelm | 208/139 |
| 3,855,980 A | 12/1974 | Weisz et al. | 123/3 |
| 3,929,431 A | 12/1975 | Koh et al. | 48/214 R |
| 3,943,236 A | 3/1976 | Green | 423/418.2 |
| 4,059,076 A | 11/1977 | Kosaka et al | 123/3 |
| 4,073,716 A | 2/1978 | Pfefferle et al. | 208/66 |
| 4,147,136 A | 4/1979 | Noguchi et al. | 123/3 |
| 4,175,386 A | 11/1979 | Katahira et al. | 60/276 |
| 4,199,938 A | 4/1980 | Nakase et al. | 60/274 |
| 4,244,328 A | 1/1981 | Lindstrom | 123/3 |
| 4,318,369 A | 3/1982 | Cronyn | 123/3 |
| 4,328,781 A * | 5/1982 | Morita | 123/568.12 |
| 4,337,170 A | 6/1982 | Fuderer | 252/373 |
| 4,340,013 A | 7/1982 | Lindstrom | 123/3 |
| 4,358,364 A | 11/1982 | Klosek et al. | 208/92 |
| 4,375,746 A | 3/1983 | Hattori | 60/274 |
| 4,425,876 A | 1/1984 | Rutledge et al. | 123/3 |
| 4,444,158 A | 4/1984 | Yoon | 123/1 A |
| 4,473,490 A | 9/1984 | Stewart | 252/373 |
| 4,475,484 A | 10/1984 | Filho et al. | 123/3 |
| 4,476,817 A | 10/1984 | Lindberg | 123/3 |
| 4,547,356 A | 10/1985 | Papineau | 423/658 |
| 4,635,609 A * | 1/1987 | Seppen et al. | 123/698 |
| 4,643,666 A | 2/1987 | Green et al. | 431/4 |
| 4,696,279 A * | 9/1987 | Lindberg | 123/568.12 |
| 4,900,333 A | 2/1990 | Bos | 48/197 R |

(List continued on next page.)

FOREIGN PATENT DOCUMENTS

| | | | |
|---|---|---|---|
| DE | 3048540 | 7/1982 | |
| GB | 2258012 | 1/1993 | |
| JP | 61171870 | 2/1986 | |
| JP | 2116603 | 10/1988 | |
| JP | 05-200252 A * | 8/1993 | 123/568.11 |
| WO | 8500159 | 1/1985 | |
| WO | 9423188 | 10/1994 | |

Primary Examiner—Willis R. Wolfe
(74) Attorney, Agent, or Firm—Christie, Parker & Hale, LLP

(57) ABSTRACT

A method of producing near zero $NO_x$ and near zero CO emissions in exhaust gas from an internal combustion engine using a gaseous fuel comprised of natural gas and at least one additional gas selected from hydrogen and carbon monoxide. A first portion of the exhaust gas is recycled for providing dilution of the fuel charge. A second portion of the exhaust gas is discharged to the atmosphere. The engine is operated to combust the gaseous fuel with air under exhaust gas recycle conditions which produce near zero $NO_x$ emissions and near zero CO emission in the exhaust discharged to the atmosphere.

10 Claims, 3 Drawing Sheets

U.S. PATENT DOCUMENTS

| | | |
|---|---|---|
| 4,919,844 A | 4/1990 | Wang .......................... 252/373 |
| 5,004,592 A | 4/1991 | Pinto ........................... 423/652 |
| 5,081,977 A | 1/1992 | Swenson ..................... 123/527 |
| 5,156,114 A | 10/1992 | Gunnerman ................ 123/1 A |
| 5,297,515 A | 3/1994 | Gale et al. ...................... 123/3 |
| 5,388,402 A | 2/1995 | Aoki et al. ..................... 60/276 |
| 5,410,872 A | 5/1995 | Adamczyk, Jr. et al. ...... 60/274 |
| 5,448,885 A | 9/1995 | Atanasyan .................... 60/274 |
| 5,488,932 A | 2/1996 | Serafini .......................... 123/3 |
| 5,592,925 A | 1/1997 | Machida et al. ........ 123/568.11 |
| 5,609,144 A | 3/1997 | Seizew et al. .......... 123/568.11 |
| 5,660,602 A | 8/1997 | Collier, Jr. et al. ......... 48/127.3 |
| 5,666,923 A | 9/1997 | Collier, Jr. et al. .......... 123/488 |
| 5,671,600 A | 9/1997 | Pischinger et al. ......... 60/605.2 |
| 5,720,266 A * | 2/1998 | Nogi et al. ................... 123/680 |
| 5,725,616 A | 3/1998 | Lynum et al. .............. 48/127.3 |
| 5,763,351 A | 6/1998 | Ichimura ..................... 502/303 |
| 5,787,864 A | 8/1998 | Collier, Jr. et al. .......... 123/492 |
| 5,814,283 A | 9/1998 | Matuoka et al. ............. 422/172 |
| 5,852,927 A | 12/1998 | Cohn et al. ................. 60/39.05 |
| 5,947,063 A * | 9/1999 | Smith et al. ..................... 123/3 |
| 5,972,829 A | 10/1999 | Ichimura ..................... 502/303 |
| 6,026,787 A | 2/2000 | Sun et al. .................... 123/525 |
| 6,079,373 A | 6/2000 | Kawamura ...................... 123/3 |

* cited by examiner

NATURAL GAS POWERED ENGINE

BACKGROUND OF THE INVENTION

This invention relates to gaseous fuel powered internal combustion engines and more particularly it relates to a method of operating an internal combustion engine using natural gas.

Natural gas is considered an excellent source of fuel for an internal combustion engine because it burns cleaner and there exist large reserves of natural gas. However, the use of natural gas to fuel internal combustion engines is not without problems. For example, there is no easy method of refueling vehicles employing natural gas. Further, natural gas requires more fuel tank volume to obtain equivalent miles when compared to diesel or gasoline powered vehicles. In addition, the use of natural gas for fuel for an internal combustion engine can result in exhaust emission problems requiring combinations of exhaust gas recirculation, positive crankcase ventilation, and catalytic converters to care for the various compounds in the exhaust gases. For example, U.S. Pat. Nos. 5,660,602; 5,666,923 and 5,787,864 disclose alternative gaseous fuel for operating a combustion engine including approximately 21 to 50% hydrogen and the rest natural gas constituents such as combinations of methane, carbon dioxide, nitrogen, ethane, propane, iso-butane, n-butane, iso-pentane, n-pentane, and hexanes, as well as others. Current production engines without any substantial modifications can use such alternative fuel which is lean burning and emits emissions that are below current legal standards.

It is also known to reform methanol to produce hydrogen for use with gasoline for internal combustion engines to reduce noxious components. For example, U.S. Pat. Nos. 4,244,328 and 4,340,013 disclose an improved process and apparatus for preparing a gaseous mixture of hydrocarbon and carbon monoxide to be supplied to the air/fuel mixture of a combustion engine. The process and apparatus are useful in reducing the amount of noxious components and aldehydes in the engine exhaust gas. In one embodiment of the invention an improved process and combustion engine are provided for reducing the noxious components and aldehydes.

U.S. Pat. No. 4,147,136 discloses a fuel reforming system for an internal combustion engine which has a fuel reforming reactor to be supplied with a hydrocarbon fuel. The reactor contains a catalyst carrier and a catalyst thereon to be heated for facilitating a conversion of the fuel into a reformed gaseous mixture rich with hydrogen which mixture is to be fed into the engine. The catalyst is periodically alternately exposed to the fuel and air so that carbon produced and deposited on the catalyst during the fuel reforming reaction facilitated by the catalyst is burnt away from the catalyst carrier and the catalyst thereon whereby the catalytic performance of the catalyst is restored to ensure a prolonged operative life thereof. The reformed gaseous mixture assures a reliable ignition and combustion of a mixture thereof with air in the engine at a very lean air-fuel ratio to advantageously decrease the emission of harmful components of engine exhaust gas.

U.S. Pat. No. 4,476,817 discloses a combustion and pollution control system wherein a controlled amount of a fluid (steam or water or a solution of water plus additives) is injected into an internal combustion engine to improve combustion, efficiency, and to reduce emissions. The amount of the fluid injected is controlled in response to engine need. The steam is generated by the heat produced by the engine. Combustion gas temperature is used to control the amount of steam produced by varying the fluid flow through one or more fixed or variable orifice control valves. The stream is injected in a piston engine to cool peak temperatures, to prevent detonation and pre-ignition, to smooth out hot spots, to prevent auto-ignition or dieseling, and to use the vapor energy in the expansion cycle to increase low speed torque and acceleration. The steam is used to cause full retard of the vacuum spark advance during acceleration at full load from low speed, and a large amount of steam is injected at this point in the cycle to prevent pre-ignition and detonation. Ultrasonic energy is added to the injected steam to produce better mixing and distribution. Hydrogen is also injected to permit better combustion with higher amounts of air. The hydrogen is produced by the interaction of a catalyst on the steam and fuel hydrocarbons and ultrasonic energy. At times exhaust gas and other additives, such as hydrogen peroxide, methyl alcohol and ammonia are injected.

U.S. Pat. No. 4,318,369 discloses a recyclable-fuel engine system designed for use in a vehicle. The system includes a hydrogen-producing catalytic unit having plural catalytic beds, and a hydrogen-fueled engine having combustion and exhaust chambers. The catalytic beds, when supplied with heat, catalyze a reduced form of a hydrocarbon carrier to hydrogen and a dehydrogenated form of the carrier. One of the catalytic beds is supplied heat by direct heat transfer from the engine's exhaust chamber. The remaining catalytic beds are supplied heat by heat pipes receiving heat from the combustion and exhaust chambers. The hydrogen produced in the catalytic unit is supplied to the engine, to power the same. Also disclosed are apparatus and method for regenerating the catalytic beds periodically.

U.S. Pat. No. 4,425,876 discloses a method of fuel treatment and distribution for an internal combustion engine including the steps of operating an adiabatic reactor without a substantial amount of exhaust heat within an operational temperature range, the catalyst bed reactor including a partial combustion catalyst and a dissociation catalyst. A substantial amount of engine exhaust heat is provided to an endothermic reactor having an endothermic dissociation catalyst therein and liquid alcohol is vaporized to form alcohol vapor. The alcohol vapor is mixed with air to form a partial combustion mixture which is contacted with the partial combustion catalyst whereby a dissociation mixture is formed and heat is evolved. The dissociation mixture and the dissociation catalyst form a hydrogen-rich fuel. The hydrogen-rich fuel and the endothermic dissociation catalyst form a fuel product whereby at least a portion of any residual undissociated alcohol in the hydrogen-rich fuel is dissociated to hydrogen and carbon monoxide using the engine waste heat provided by the exhaust gas.

U.S. Pat. No. 4,444,158 discloses a method of methyl alcohol treatment for an automobile internal combustion engine wherein the methyl alcohol is converted to a hydrogen-rich fuel for burning in the internal combustion engine.

U.S. Pat. No. 4,475,484 discloses an apparatus for the catalytic transformation of fuel for use with an internal combustion engine. The apparatus comprises a catalytic reactor in the form of a chamber containing catalytic material, and through which liquid or vaporized fuel is passed, the reactor chamber being in close thermal communication with the exhaust gases leaving the internal combustion engine. Said reactor chamber is either placed within the exhaust gas chamber of the engine exhaust manifold, or in very close proximity thereto. In a preferred arrangement, there are two reactor chambers in series, one being formed within the exhaust manifold of the engine, and the other being mounted closely adjacent thereto.

U.S. Pat. No. 4,547,356 discloses a method for generating hydrogen. The system includes a reactor that has reaction zones wherein catalyst and elevated temperatures generate hydrogen from steam. The zones in the reactor are in the form of tubes about a heat generating chamber, and the zones are adapted to be interconnected to each other, to atmosphere, and to the source of steam, all to maximize the generation of hydrogen by providing a reactor of optimum flexibility.

U.S. Pat. No. 5,156,114 discloses an aqueous fuel for an internal combustion engine. The fuel comprises water from about 20 percent to about 80 percent by volume of the total volume of said fuel, and a carbonaceous fuel selected from the class consisting of ethanol, methanol, gasoline, kerosene fuel, diesel fuel, carbon-containing gaseous or liquid fuel, diesel fuel, carbon-containing gaseous or liquid fuel, or mixtures thereof. A method for combusting an aqueous fuel in an internal combustion engine is provided. The method produces approximately as much power as the same volume of gasoline. The method comprises introducing air and aqueous fuel into a fuel introduction system for the engine. The fuel comprises water from about 20 percent to about 80 percent by volume of the total volume of the fuel, and a carbonaceous fuel from ethanol, methanol, gasoline, kerosene fuel, diesel fuel, carbon-containing gaseous or liquid fuel, or mixtures thereof, and introducing and combusting said air/fuel mixture in a combustion chamber or chambers in the presence of a hydrogen producing catalyst to operate the engine.

U.S. Pat. No. 5,297,515 discloses an engine which, in at least one cylinder or combustion area, is provided with a hydrocarbon rich fuel which produces upon combustion an exhaust gas containing unburned hydrocarbons, water vapor and carbon monoxide. The exhaust gas is treated in a catalytic converter and the reaction process that occurs therein produces hydrogen and carbon dioxide which is mixed with air to form a hydrocarbon lean, hydrogen enriched mixture. The mixture is subsequently ignited in other cylinders or combustion areas of the engine to produce power.

U.S. Pat. No. 5,488,932 discloses a gaseous fuel-enriching subsystem for an internal combustion engine including a supplemental intake conduit to an intake manifold internal combustion engine. Such supplemental input is provided with numerous apertures therein. An exhaust gas conduit from the internal combustion engine annularly surrounds the intake conduit permitting fuel values from exhaust in the exhaust conduit to enter the supplemental intake conduit through such apertures. A water supply input to the supplemental intake conduit, at an end opposite to the location of the manifold, provides a further fuel input to the supplemental intake conduit in that water from the water supply is evaporated and then hydrolyzed, separating the water into its chemical constituents of hydrogen and oxygen, thusly producing an enriched gaseous fuel mixture with the recycled exhaust gas which is fed to the manifold.

In spite of these disclosures, there is still required a method of operating an internal combustion engine on a gaseous fuel such as natural gas or propane which permits significant charge dilution without engine misfire to produce exhaust gas with near-zero $NO_x$.

SUMMARY OF THE INVENTION

It is an object of this invention to provide a method of operating an internal combustion engine.

It is a further object of this invention to provide an improved method of operating a combustion engine to provide an exhaust gas having near-zero $NO_x$ using charge dilution by recycling exhaust gas.

It is still another object of the invention to provide an improved method for operating a combustion engine on gaseous fuel such as natural gas or propane or the like to provide an exhaust gas having near-zero $NO_x$ using charge dilution.

Yet it is another object of the invention to provide an improved method for operating an internal combustion engine on a gaseous fuel comprised of natural gas and hydrogen and carbon monoxide using exhaust gas recycle to produce low $NO_x$ and lean burn conditions to obtain low carbon monoxide.

These and other objects will become apparent from a reading of the specification and claims appended hereto.

In accordance with these objects, there is provided a method of producing near-zero $NO_x$ and near-zero CO emissions in exhaust gas from an internal combustion engine using a gaseous fuel. The method comprises providing an internal combustion engine having intakes for fuel and air and an having exhaust gas. A first portion of the exhaust gas is recycled for adding to the engine air intake. A second portion of the exhaust gas is discharged to the atmosphere. A gaseous fuel comprised of natural gas and at least one additional gas selected from hydrogen and carbon monoxide is provided for adding to the engine. The engine is operated to combust the fuel and the first portion of exhaust gas with air under exhaust gas recycle conditions which produce near-zero $NO_x$ emissions in said exhaust gas emitted from said engine and under lean burn conditions which provide up to 4% oxygen in the exhaust gas emitted from the engine. Carbon monoxide in the second portion of the exhaust gas is oxidized using said oxygen and an oxidizing gas catalyst. Thus, exhaust gas discharged to the atmosphere has both near-zero carbon monoxide emission and near-zero $NO_x$.

DETAILED DESCRIPTION OF THE PREFERRED EMBODIMENTS

Figure 1:
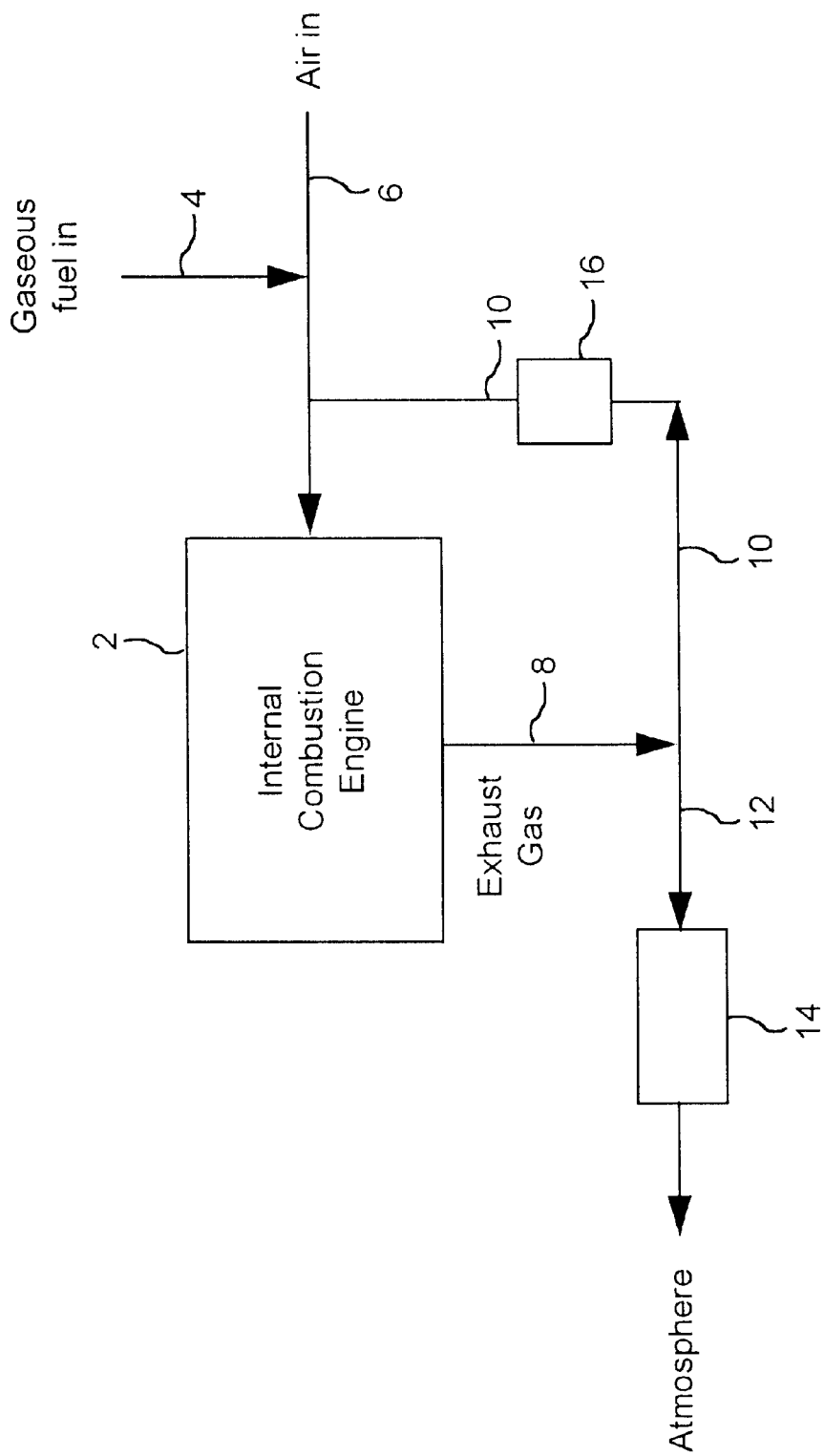
FIG. 1 is a schematic representation showing steps in operating an internal combustion engine to provide exhaust gases having near-zero $NO_x$ and near zero CO emissions.

Referring now to FIG. 1, there is illustrated a novel method for operating an internal combustion engine to produce exhaust gases having near-zero $NO_x$ and near-zero CO emissions. In FIG. 1 there is provided an internal combustion engine 2. A gaseous fuel is introduced to internal combustion engine 2 along line 4 and line 6. Air is shown being introduced along line 6. While gaseous fuel is shown for convenience being introduced along lines 4 and 6, it will be understood that the fuel can be introduced to a combustion chamber of internal combustion engine 2 independent of air line 6. After combustion of the fuel and air mixture, exhaust gases are removed from internal combustion engine 2 along line 8. A first portion of the exhaust gas is recirculated along line 10 and reintroduced with the gaseous fuel to internal combustion engine 2. A second portion of exhaust gas is directed along line 12 into catalytic converter 14 which uses an oxidizing catalyst before being discharged to the atmosphere. A heat exchanger 16 may be provided in exhaust gas recirculation line 10 for purposes of reducing the temperature of the recirculated exhaust gases. Reducing the temperature of the exhaust gases will increase the volumetric efficiency of the engine. The term volumetric efficiency is used to describe the amount of gases an internal combustion engine can process in one cycle. The higher the volumetric efficiency, the greater the amount of fuel which can be added for the same equivalence ratio and thus the greater power output of the engine. Heat exchanger 16 also operates to remove water from the recirculated exhaust gases. Heat exchanger 16 may be cooled using ambient air, engine cooling liquid or other cooling means.

In the present invention, the gaseous fuel is comprised of natural gas, hydrogen and/or carbon monoxide. Natural gas is comprised mainly of methane and lesser amounts of ethane, propane, butane, and pentane and other hydrocarbons along with nitrogen and carbon dioxide. The amounts of these constituents can vary, depending on the source of the natural gas. The gaseous fuel useful in the invention includes hydrogen and optionally carbon monoxide to extend the combustion limit of the natural gas under large amounts of exhaust dilution to produce near zero $NO_x$.

For purposes of the invention, the gaseous fuel should comprise 20 to 60 vol. % hydrogen, the remainder natural gas. Carbon monoxide can be used to replace a portion of the hydrogen. If carbon monoxide is combined with hydrogen, the molar amount of both should also be about 20 to 60 vol. %. If hydrogen is replaced by carbon monoxide then an equivalent amount should be used.

For purposes of producing near-zero $NO_x$, in the present invention, the gaseous fuel charge submitted to the internal combustion engine is subject to charge dilution using exhaust gas. That is, by introducing additional gases to the combustion process for a given amount of fuel, the heat capacity of the gases within the engine combustion chamber is increased during the combustion process. This increase in heat capacity reduces the peak temperature of the combustion process which is an important mechanism in producing near-zero $NO_x$. In the present invention, the recirculation of the exhaust gases operate to dilute combustion gases charged to the internal combustion engine. Exhaust gas has a higher heat capacity than an equivalent volume of air. Thus, the use of exhaust gas as a charge dilution gas is more effective in reducing $NO_x$ emission in an engine because of its higher heat capacity per unit volume.

However, the incorporation of large amounts of dilution gases to produce near-zero $NO_x$ has the problem of producing a negative combustion effect referred to herein as misfire. With conventional fuels, misfire will normally occur before sufficient charge dilution gases are incorporated to produce near-zero $NO_x$. Thus, it is important to add a combustible gas with wide flammability limits to the fuel to eliminate misfire in the engine. In the present invention, a combustible gas that can be added to eliminate misfire is selected from at least one of hydrogen and carbon monoxide. That is, either hydrogen or carbon monoxide or a combination of both can be added to a fuel charge of natural gas to eliminate engine misfire under exhaust gas charge dilution to produce near zero $NO_x$.

In the invention, the exhaust gas discharged to the atmosphere is treated to provide near-zero CO emission using an oxidizing catalyst to convert carbon monoxide to carbon dioxide before being discharged. Thus, while exhaust gas recirculation is used in the present invention to provide charge dilution to achieve low or near-zero $NO_x$ emissions, a control level of lean bump is required to provide sufficient oxygen in the exhaust gas for purposes of converting carbon monoxide to carbon dioxide. Lean burn conditions are used to provide 0.5 to 4% oxygen in the exhaust gas. For purposes of the invention, the amount of lean burn required is obtained by regulating the amount of fuel introduced to the air stream entering the engine. The correct amount of fuel can be determined by use of an oxygen sensor placed in exhaust gas stream 8. Alternatively, the amount of fuel can be regulated by knowing the mass flow rate of air and fuel. In the present invention, the amount of carbon monoxide in the exhaust gas ranges between 200 to 600 parts per million when oxygen is in the range of about 0.5 to 4%.

For purposes of operating the internal combustion engine under conditions that produce near zero carbon monoxide in the exhaust discharged, the engine is operated at air and gaseous fuel equivalence ratios, $\Phi$, in the range of 0.99 to 0.7, with preferred ratios being in the range of 0.95 to 0.8. For purposes of operating the internal combustion engine under conditions that produce near-zero $NO_x$ in the exhaust discharge, the engine is operated at air plus recirculated exhaust to gaseous fuel equivalence ratios, $\Phi$, in the range of 0.6 to 0.45, with the preferred ratios being in the range of 0.58 to 0.52.

By near-zero $NO_x$ is meant that less than 10 ppm $NO_x$ is present in the exhaust gas emitted from the internal combustion engine.

By near-zero CO is meant that less than 10 ppm carbon monoxide is present in the exhaust gas discharged to the atmosphere.

In accordance with the present invention, 30 to 50 vol. % of the exhaust gas emitted from internal combustion engine 2 is recirculated and added to the gaseous fuel/air mixture for purposes of dilution of the mixture for purposes of providing near-zero $NO_x$ in the exhaust gases.

As noted, the second portion of the exhaust gas to be discharged to the atmosphere is first forwarded along line 12 for treatment in catalytic reactor 14. Reactor 14 oxidizes the carbon monoxide in the exhaust to carbon dioxide by use of the excess oxygen resulting from the lean burn. Accordingly, carbon monoxide is converted to carbon dioxide before the second portion of the exhaust gas is discharged to the atmosphere. Catalytic reactor 14 can be comprised of a bed of particles or extruded parallel channels. The base material for the particles and the channels can be any suitable refractory such as alumina or cordierite. The catalyst is coated on the base material and can comprise platinum, palladium, rhodium or a mixture thereof Typically, the amount of carbon monoxide entering reactor 14 is less than 1000 ppm and typically the amount leaving the reactor is less than 5 ppm. Further, the operating temperature of the reactor is typically greater than 300° C.

The present invention provides for an improved internal combustion engine which discharges exhaust gases to the atmosphere having reduced amounts of $NO_x$ and carbon monoxide. A portion of the engine exhaust gases are recirculated and introduced with gaseous fuel comprised of natural gas, hydrogen and/or carbon monoxide to provide for near-zero $NO_x$ in gas emitted from the engine. Further, the mixture of recirculated exhaust gas, natural gas, hydrogen and air is blended to produce a controlled level of lean burn to ensure not greater than 4% oxygen in the exhaust gas. As noted, the oxygen is used to oxidize carbon monoxide to carbon dioxide in an oxidizing catalytic reactor before the second portion of the exhaust gas is discharged to the atmosphere. Means is provided for recycling a portion of the exhaust gas and means is provided for blending or mixing the recycled exhaust gas with air-fuel feed. Further, fuel feed means is provided for introducing the mixture to the internal combustion engine. Additional means is provided for treating the remaining or second portion of the exhaust gas to react carbon monoxide therein with oxygen to convert the carbon monoxide to carbon dioxide before discharging to the atmosphere. The exhaust gases discharged to the atmosphere have both near-zero $NO_x$ and near-zero CO.

Figure 2:
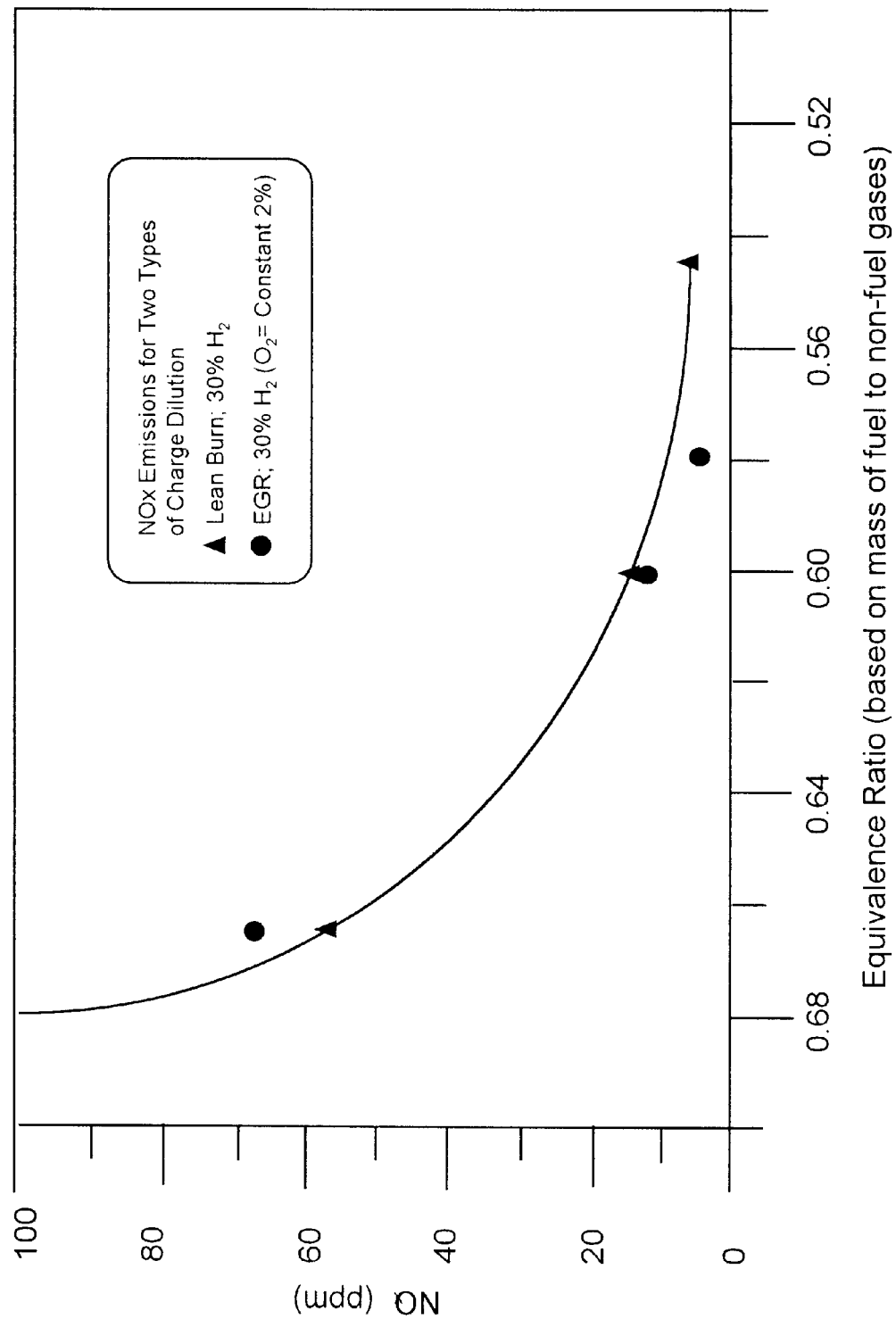
FIG. 2 is a graph illustrating the effectiveness of exhaust gas dilution in using the combination of hydrogen and natural gas to produce near-zero $NO_x$ emissions.

FIG. 2 shows a comparison between $NO_x$ reduction using only lean burn and a combination of exhaust gas recirculation with moderate lean burn. In both cases, the fuel is a mixture of 70% natural gas and 30% hydrogen by volume. The equivalence ratio in FIG. 2 is calculated on the basis of stoichiometric weight based on air fuel ratio divided by the ratio of actual weight of air and exhaust gas to weight of fuel. FIG. 2 shows that $NO_x$ emissions of less than 10 ppm can be obtained by operating an internal combustion engine at very low equivalence ratios obtained by EGR with only 2% exhaust gas oxygen.

Figure 3:
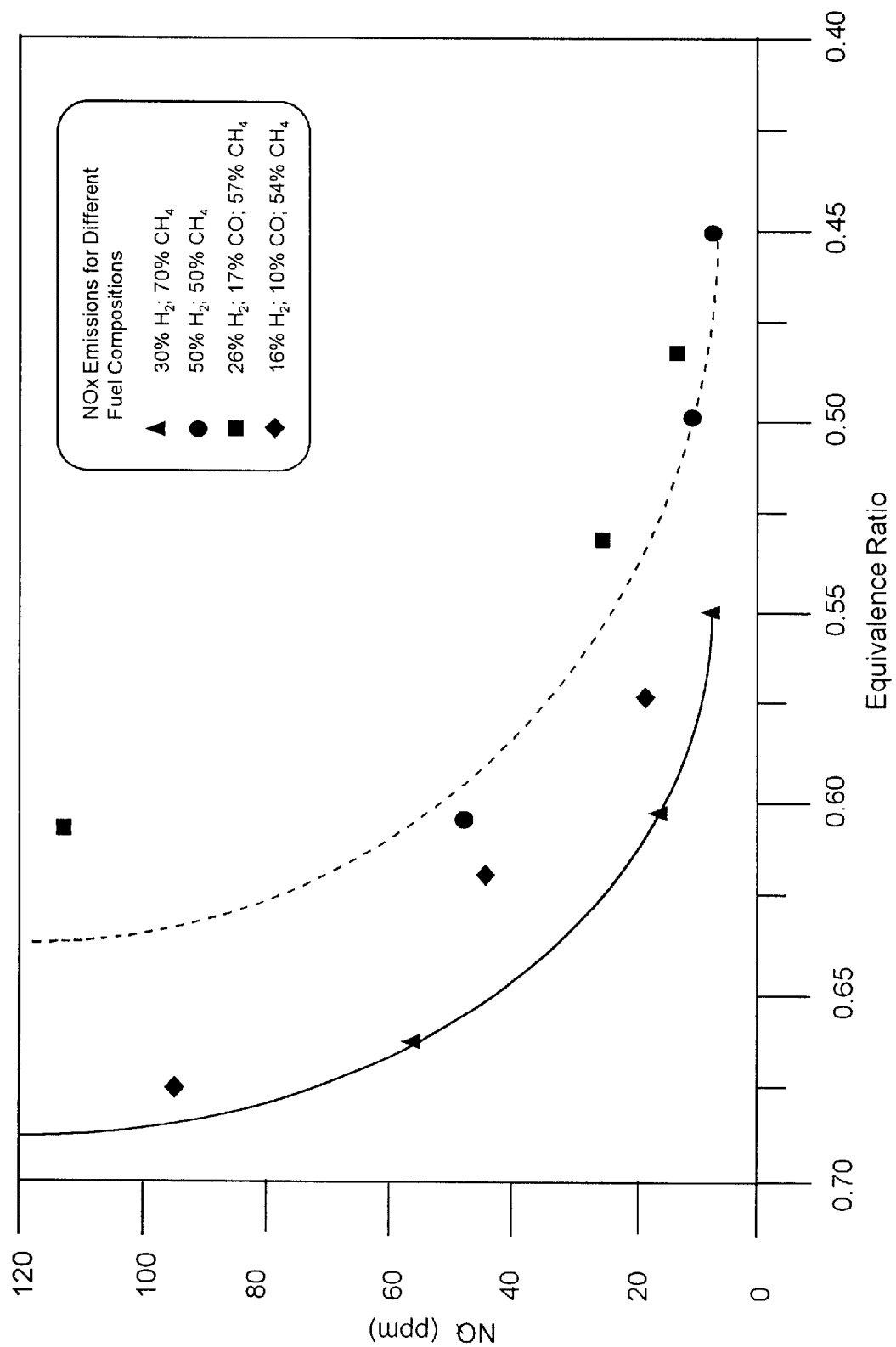
FIG. 3 is a graph illustrating the effectiveness of hydrogen and carbon monoxide mixtures in extending lean burn combustion limits to produce near-zero $NO_x$.

FIG. 3 is a comparison of the effectiveness of adding only hydrogen to natural gas to extend the combustion limit to adding an equivalent molar concentration of hydrogen and carbon monoxide. The equivalence ratio in FIG. 3 is calculated similarly to that described with respect to FIG. 2 except that no exhaust gas recirculation was used for the data shown. FIG. 3 shows that the $NO_x$ formation compared to equivalence ratio for a fuel consisting of 30% hydrogen and 70% natural gas is approximately equivalent to a 26% mixture of hydrogen and carbon monoxide and 74% natural gas. Also, FIG. 3 shows that the $NO_x$ formation compared to equivalence ratio for a fuel consisting of 50% hydrogen and 50% natural gas is approximately equivalent to a 43% mixture of hydrogen and carbon monoxide and 57% natural gas. Thus, this data shows that $NO_x$ emissions can be reduced to less than 10 ppm when a mixture of hydrogen and carbon monoxide is added to natural gas in sufficient quantity to allow engine operation at very low equivalence ratios.

While the invention has been described in terms of preferred embodiments, the claims appended hereto are intended to encompass other embodiments which fall within the spirit of the invention.

What is claimed is:

1. A method of producing near-zero $NO_x$ and near-zero CO emissions in exhaust gas from an internal combustion engine using a gaseous fuel wherein the exhaust gas includes water vapor, the method comprising the steps of:
   (a) providing an internal combustion engine having an intake for fuel and having exhaust gas;
   (b) providing a gaseous fuel comprised of natural gas and hydrogen sufficient to prevent said engine from misfiring during operation and adding said gaseous fuel to said engine;
   (c) separating the exhaust gas from the internal combustion engine into first and second portions, wherein the first portion comprises 30 to 50% of the exhaust gas;
   (d) cooling the first portion of the exhaust gas to condense at least a portion of the water vapor;
   (e) separating the condensed water from the first portion of the exhaust gas;
   (f) discharging a second portion of the exhaust gas to the atmosphere;
   (g) operating said engine to combust a charge of said gaseous fuel and air in an equivalence ratio in the range of 0.6 to 0.45, said charge diluted with said first portion of exhaust gas, said operating being carried out:
      (i) to produce not greater than 10 ppm $NO_x$ emissions in said exhaust gas emitted from said engine; and
      (ii) under lean burn conditions to provide not less than 0.5% oxygen in said exhaust gas emitted from said engine; and
   (h) oxidizing CO in said second portion of the exhaust gas using an oxidizing catalyst to produce not greater than 10 ppm CO emission in said second portion of the exhaust gas discharged to the atmosphere.

2. A method of producing near-zero $NO_x$ and near-zero CO emissions in exhaust gas from an internal combustion engine using a gaseous fuel wherein the exhaust gas includes water vapor, the method comprising the steps of:
   (a) providing an internal combustion engine having an intake for fuel and having an exhaust gas;
   (b) providing a gaseous fuel comprised of natural gas and at least one additional gas selected from hydrogen and CO and adding said gaseous fuel to said engine;
   (c) recirculating a first portion of the exhaust gas, cooling the first portion of exhaust gas to condense at least a portion of the water vapor, removing the condensed water from the first portion of exhaust gas, and adding said first portion of exhaust gas to said engine;
   (d) discharging a second portion of the exhaust gas, to the atmosphere;
   (e) operating said engine to combust a charge of said gaseous fuel and air, said charge diluted with said first portion of exhaust gas, said operating being carried out;
      (i) under exhaust gas recycle conditions which product near-zero $NO_x$ emissions in said exhaust gas emitted from said engine; and
      (ii) under lean burn conditions to provide oxygen in said exhaust gas emitted from said engine; and
   (f) oxidizing CO in said second portion of the exhaust gas using an oxidizing catalyst to product near-zero CO emission in said second portion of the exhaust gas discharged to the atmosphere.

3. The method in accordance with claim 2 wherein said additional gas is hydrogen.

4. The method in accordance with claim 2 wherein said additional gas is CO.

5. The method in accordance with claim 2 wherein said first portion of exhaust recycled comprises 30 to 50% of the exhaust gas emitted from said engine.

6. The method in accordance with claim 2 including utilizing an air and fuel equivalence ratio in the range of 0.99 to 0.7.

7. The method in accordance with claim 2 including utilizing an air and fuel equivalence ratio in the range of 0.95 to 0.8.

8. The method in accordance with claim 2 wherein said $NO_x$ emissions are less than 10 ppm and said CO emissions are less than 10 ppm.

9. The method in accordance with claim 2 including operating said engine under lean burn conditions which provides up to 4% oxygen in said exhaust gas emitted from said engine.

10. The method in accordance with claim 2 wherein said gaseous fuel comprises natural gas and combination of hydrogen and carbon monoxide.

* * * * *

UNITED STATES PATENT AND TRADEMARK OFFICE
CERTIFICATE OF CORRECTION

PATENT NO.     : 6,405,720 B1
DATED          : June 18, 2002
INVENTOR(S)    : R. Kirk Collier, Jr.

It is certified that error appears in the above-identified patent and that said Letters Patent is hereby corrected as shown below:

Column 8,
Lines 34 and 40, replace "product" with -- produce --
Line 37, replace "bum" with -- burn --
Line 64, replace "combination" with -- combinations --

Signed and Sealed this

Eleventh Day of November, 2003

JAMES E. ROGAN
*Director of the United States Patent and Trademark Office*